US010113569B2

(12) United States Patent
Oozeki et al.

(10) Patent No.: US 10,113,569 B2
(45) Date of Patent: Oct. 30, 2018

(54) SENSOR MOUNTING DEVICE FOR HYDRAULIC CYLINDER

(71) Applicant: SMC CORPORATION, Chiyoda-ku (JP)

(72) Inventors: Koutarou Oozeki, Katsushika-ku (JP); Junji Nishino, Moriya (JP); Atsushi Tamai, Moriya (JP); Takashi Nonaka, Moriya (JP)

(73) Assignee: SMC CORPORATION, Chiyoda-ku (JP)

(*) Notice: Subject to any disclaimer, the term of this patent is extended or adjusted under 35 U.S.C. 154(b) by 62 days.

(21) Appl. No.: 15/316,044

(22) PCT Filed: Aug. 18, 2014

(86) PCT No.: PCT/JP2014/071522
§ 371 (c)(1),
(2) Date: Dec. 2, 2016

(87) PCT Pub. No.: WO2015/186264
PCT Pub. Date: Dec. 10, 2015

(65) Prior Publication Data
US 2017/0089368 A1 Mar. 30, 2017

(30) Foreign Application Priority Data

Jun. 5, 2014 (JP) .................. 2014-117036

(51) Int. Cl.
F15B 15/28 (2006.01)
F16B 2/08 (2006.01)

(52) U.S. Cl.
CPC ............ F15B 15/2892 (2013.01); F16B 2/08 (2013.01)

(58) Field of Classification Search
CPC ................ F15B 15/2892; F16B 2/08
See application file for complete search history.

(56) References Cited

U.S. PATENT DOCUMENTS

D427,052 S * 6/2000 Nagato .......................... D8/396
7,372,708 B2 * 5/2008 Terasaki .............. F15B 15/2892
200/275

(Continued)

FOREIGN PATENT DOCUMENTS

EP 0 894 983 A2 2/1999
JP 60-188311 U 12/1985

(Continued)

OTHER PUBLICATIONS

International Search Report dated Sep. 16, 2014, in PCT/JP2014/071522 filed Aug. 18, 2014.

(Continued)

Primary Examiner — Robert Sandy
Assistant Examiner — Louis A Mercado
(74) Attorney, Agent, or Firm — Oblon, McClelland, Maier & Neustadt, L.L.P.

(57) ABSTRACT

A fitting band includes an annular portion wound and attached around an outer periphery of a cylinder tube, a pair of sensor holding portions that are formed at both ends of the annular portion and that pinches a position sensor, the pair of sensor holding portions being fastened from both sides with a fastening screw, the sensor holding portions being formed by providing reinforcing plates on outer surfaces of reinforcing plate attaching portions at end portions of the band main body in a superposed manner, tip edges of the reinforcing plate attaching portions being formed in straight lines, inclined portions being formed in distal end portions of the reinforcing plates, the tip edges of the reinforcing plate attaching portions extending along folding lines of the inclined portions.

12 Claims, 2 Drawing Sheets

(56) References Cited

U.S. PATENT DOCUMENTS

| | | | |
|---|---|---|---|
| D687,698 S * | 8/2013 | Machijima | D8/354 |
| 9,194,406 B2 * | 11/2015 | Machijima | F15B 15/28 |
| 9,528,816 B2 * | 12/2016 | Machijima | G01B 7/14 |
| D782,928 S * | 4/2017 | Takakuwa | D10/103 |
| D782,929 S * | 4/2017 | Takakuwa | D10/103 |
| D782,930 S * | 4/2017 | Takakuwa | D10/103 |
| D782,931 S * | 4/2017 | Takakuwa | D10/103 |
| 2014/0266167 A1 | 9/2014 | Machijima et al. | |

FOREIGN PATENT DOCUMENTS

| | | |
|---|---|---|
| JP | 1-71204 U | 5/1989 |
| JP | 2010-65839 A | 3/2010 |
| JP | 2013-60980 A | 4/2013 |

OTHER PUBLICATIONS

Taiwanese Office Action dated Jul. 4, 2016 in Taiwanese Patent Application 103129373, with English Translation.

\* cited by examiner

SENSOR MOUNTING DEVICE FOR HYDRAULIC CYLINDER

TECHNICAL FIELD

The present invention relates to a sensor mounting device for mounting, on a cylindrical hydraulic cylinder, a positon sensor detecting a position of a piston.

BACKGROUND ART

Typically, a position sensor is mounted on a hydraulic cylinder for detecting a position of a piston during operation and for using a detection signal thereof as a control signal. Such a position sensor detects magnetism of a permanent magnet mounted in the piston and, normally, as illustrated in Patent Literature (PTL) 1, is mounted on a cylindrical cylinder tube by using a belt-shaped metal fitting band.

In the fitting band disclosed in PTL 1 described above, metal reinforcing plates (press plates) are, by a method such as spot welding, fixed to outer surfaces of reinforcing plate attaching portions formed at both ends of the fitting band so as to oppose each other, the position sensor is pinched between a pair of opposing reinforcing plates, and the pair of reinforcing plates are fastened with a fastening screw in the above state, such that the position sensor is fixed to an outer periphery of the cylinder tube.

However, in a case in which the position sensor is fixed on the outer periphery of the cylinder tube using such a fitting band, when the fastening screw is rotated and tightly fastened, due to frictional force acting between the fastening screw and the reinforcing plates, rotational force in a direction following the rotation of the fastening screw acts on the reinforcing plates. Accordingly, shearing force in the rotation direction of the fastening screw acts between the reinforcing plates and the reinforcing plate attaching portions of the fitting band, causing the welded portion between the reinforcing plates and the fitting band to become separated such that problems, such as a misalignment with respect to each other, easily occur.

Meanwhile, there is also a method of fixing the position sensor on the cylinder tube by, in a state in which the position sensor is directly pinched between the pair of reinforcing plate attaching portions without fixing the reinforcing plate attaching portions of the fitting band and the reinforcing plates to each other, abutting the reinforcing plates to the outer surface of the reinforcing plate attaching portions and, in that state, fastening the reinforcing plates from both sides with the fastening screw. Such a fixing method does not require the fitting band and the reinforcing plates to be fixed to each other with a method such as spot welding or the like; accordingly, while it has an advantage in that the fitting band is simple in structure, compared with a case in which the reinforcing plates and the reinforcing plate attaching portions are fixed to each other by spot welding or the like, it has a problem in that disposition in the rotation direction occur easily.

CITATION LIST

Patent Literature

PTL 1: Japanese Unexamined Utility Model Registration Application Publication No. 1-71204

SUMMARY OF INVENTION

Technical Problem

An object of the present invention is to provide a sensor mounting device superior in usability and durability in which, when mounting a position sensor on a hydraulic cylinder, even if relative rotational force acts between a fitting band and a reinforcing plate by tightly fastening a fastening screw, there is no relative misalignment between the fitting band and the reinforcing plate in a rotation direction.

Solution to Problem

In order to achieve the object described above, a sensor mounting device of the present invention is a sensor mounting device for mounting, on an outer periphery of a cylindrical cylinder tube, a position sensor that detects a position of a piston of a hydraulic cylinder, the sensor mounting device including a fitting band, and a fastening screw that fastens the fitting band and that fixes the position sensor onto the cylinder tube. The fitting band includes an annular portion wound and attached around the outer periphery of the cylinder tube, and first and second sensor holding portions formed on a first end and a second end of the annular portion so as to oppose each other, the first and second sensor holding portions pinching the position sensor from both sides. The annular portion is formed of a metal belt-shaped band main body, the first and second sensor holding portions are formed by being provided with metal reinforcing plates in a superposed manner on an outer surface of first and second reinforcing plate attaching portions formed at a first end and a second end of the band main body so as to oppose each other, screw insertion holes for inserting the fastening screw are formed in the first and second reinforcing plate attaching portions and the first reinforcing plate provided on the first reinforcing plate attaching portion in a superposed manner, and a screw hole for screwing the fastening screw thereto is formed in the second reinforcing plate provided on the second reinforcing plate attaching portion in a superposed manner. Tip edges of the first and second reinforcing plate attaching portions of the band main body are formed in straight lines parallel to an axis of the annular portion, and shapes of the first and second reinforcing plates in front view are rectangular, an inclined portion is at least formed at a distal end portion of the second reinforcing plate among the first and second reinforcing plates by inwardly bending the distal end portion along a folding line parallel to the axis of the annular portion, the tip edge of the reinforcing plate attaching portion among the first and second reinforcing plate attaching portions of the band main body including the reinforcing plate having the inclined portion provided in a superposed manner extends along the folding line of the inclined portion.

In the present invention, it is desirable that in the sensor mounting device, when fixing the position sensor disposed between the first and second sensor holding portions to an outer peripheral surface of the cylinder tube by fastening the fastening screw, the inclined portion of the reinforcing plate has both a function of urging the position sensor against the outer peripheral surface of the cylinder tube by abutting against an upper end portion of a lateral side of the position sensor, and a function of preventing relative rotation of the reinforcing plates with respect to the reinforcing plate attaching portions by locking to the tip edge of the reinforcing plate attaching portion.

Furthermore, in the present invention, in the sensor mounting device, the inclined portion may be formed in both of the first and second reinforcing plates, the tip edges of the first and second reinforcing plate attaching portions may each extend along a folding line of the inclined portion of the corresponding one of the first and second reinforcing plates.

Furthermore, it is desirable that a thickness of each reinforcing plate is larger than a thickness of the band main body, a width of each reinforcing plate is equivalent to a width of each reinforcing plate attaching portions in the band main body, and an inclination angle of each inclined portion is smaller than 90 degrees.

In the present invention, the first reinforcing plate attaching portions and the first reinforcing plate may be fixed or unfixed to each other, and the second reinforcing plate attaching portions and the second reinforcing plate may be fixed or unfixed to each other.

Furthermore, in the present invention, desirably, a plurality of antisliding projections that protrude on an inner peripheral surface side of the annular portion are formed in the annular portion of the band main body.

Advantageous Effects of Invention

According to the present invention, since the inclined portion is formed in the distal end portion of the reinforcing plate, and since the straight tip edge of the reinforcing plate attaching portion extends along the folding line of the inclined portion, when fixing the position sensor by fastening the fastening screw, even if rotational force in the direction following the rotation of the fastening screw acts on the reinforcing plate, the inclined portion of the reinforcing plate is locked to the tip edge of the reinforcing plate attaching portion such that the relative rotation of the reinforcing plate with respect to the reinforcing plate attaching portions is prevented and no relative misalignment, deformation, and the like between the reinforcing plate and the reinforcing plate attaching portions occur.

DESCRIPTION OF EMBODIMENTS

Figure 1:
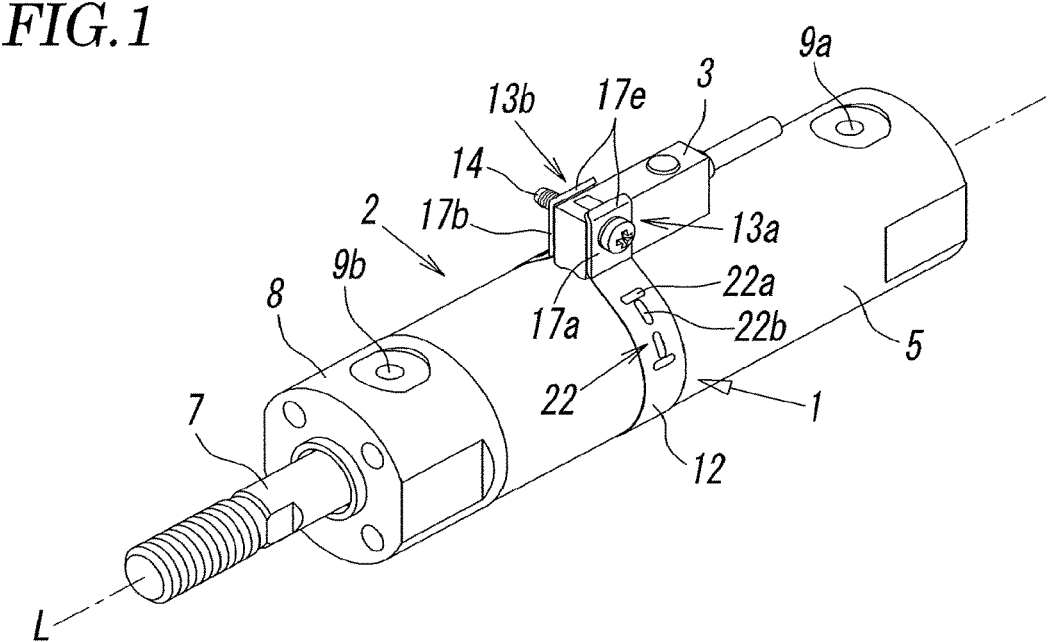
FIG. 1 is a perspective view illustrating a state in which a position sensor is mounted on a hydraulic cylinder with a sensor mounting device according to the present invention.
Figure 2:
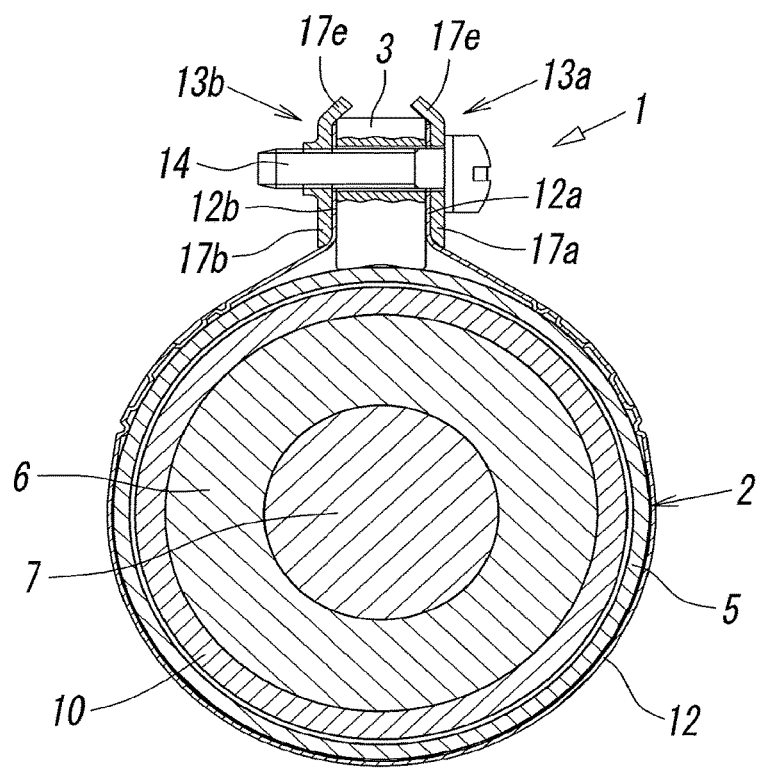
FIG. 2 is an enlarged cross-sectional view of FIG. 1.
Figure 3:
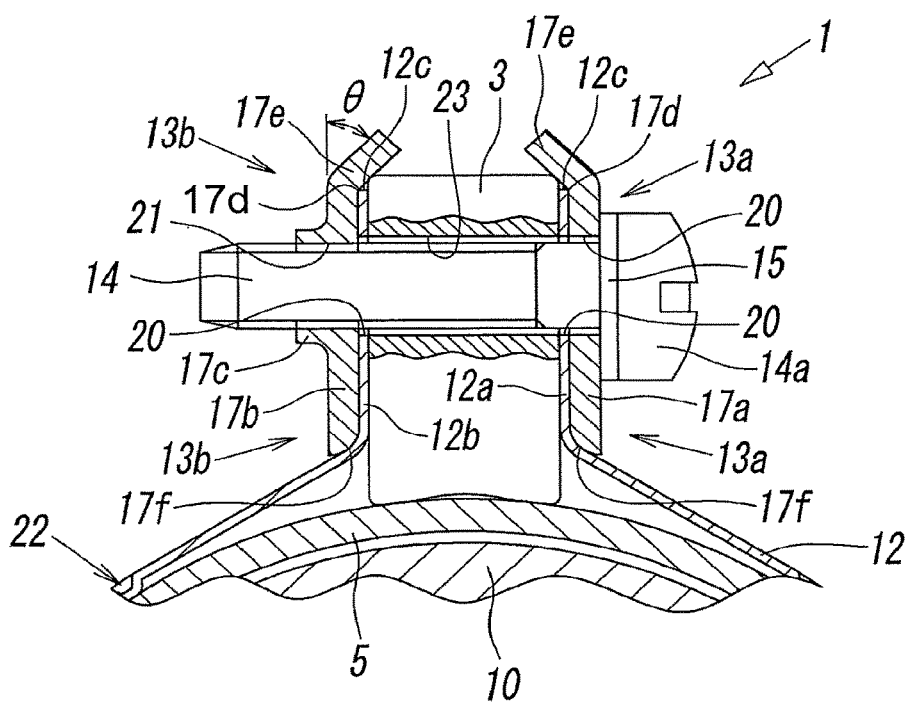
FIG. 3 is an enlarged view of an essential portion of FIG. 2.

FIGS. 1 to 3 illustrate a state in which a position sensor 3 is mounted on a hydraulic cylinder 2 with a sensor mounting device 1 according to the present invention.

The hydraulic cylinder 2 includes a cylindrical cylinder tube 5. A piston 6 is accommodated inside the cylinder tube 5 so as to be slidable in an axis L direction. A distal end of a rod 7, a base end of which is connected to the piston 6, extends externally from a rod cover 8 connected to one end of the cylinder tube 5. Ports 9a and 9b are formed in the other end of the cylinder tube 5 and in the rod cover 8. A pressure fluid (compressed air, for example) is alternatively supplied to and discharged from pressure chambers at both sides of the piston 6 through the ports 9a and 9b, such that the piston 6 and the rod 7 are moved forward and back along the axis L.

A ring-shaped permanent magnet 10 is mounted on the outer periphery of the piston 6. By detecting the magnetism of the permanent magnet 10 with the position sensor 3, the position of the piston 6 during operation is detected.

Figure 4:
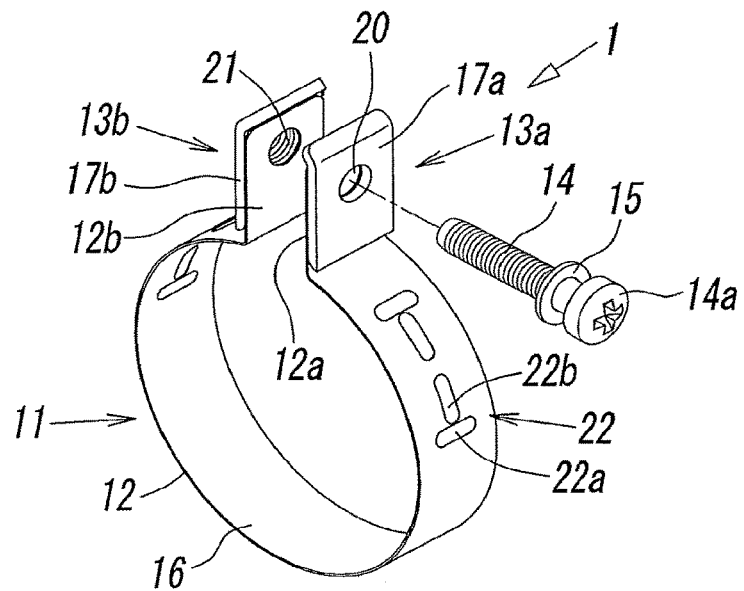
FIG. 4 is a perspective view illustrating disassembled fitting band and fastening screw.

As it is evident from FIG. 4, the sensor mounting device 1 includes a fitting band 11, and a fastening screw 14 that fastens a pair of sensor holding portions 13a and 13b at both ends of the fitting band 11 from both sides while interposing the position sensor 3 between the sensor holding portions 13a and 13b. The fastening screw 14 is a tapered screw in which a diameter of a tip portion is gradually reduced. Reference numeral 14a in the figure is a screw head, and reference numeral 15 is a plain washer.

The fitting band 11 includes an annular portion 16 wound and attached around the outer periphery of the cylinder tube 5 by winding and the first and second sensor holding portions 13a and 13b formed so as to oppose each other at both ends of the annular portion 16.

The annular portion 16 is formed of a belt-shaped band main body 12 made of metal, such as stainless steel, having elasticity. Furthermore, the first and second sensor holding portions 13a and 13b include first and second reinforcing plates 17a and 17b formed of metal, such as stainless steel, having rigidity that are fixed, by a method such as spot welding or the like, to outer surfaces of first and second flat reinforcing plate attaching portions 12a and 12b formed so as to oppose each other at both ends of the band main body 12. As described above, in the present invention, the state in which the outer surfaces of the reinforcing plate attaching portions 12a and 12b are disposed in an overlapped state with respect to the reinforcing plates 17a and 17b is described as the reinforcing plates 17a and 17b being provided in a superposed manner with respect to the reinforcing plate attaching portions 12a and 12b. As described later, the above includes a case in which the reinforcing plates 17a and 17b are not fixed to the reinforcing plate attaching portions 12a and 12b.

As it is evident from FIG. 4, on one of the first sensor holding portion 13a side among the pair of sensor holding portions 13a and 13b, a screw insertion hole 20 for inserting the fastening screw 14 into the first reinforcing plate attaching portion 12a and the first reinforcing plate 17a is formed. On the other second sensor holding portion 13b side, as well as a screw insertion hole 20 being formed in the second reinforcing plate attaching portion 12b, a screw hole 21 for screwing the fastening screw 14 thereto is formed in the second reinforcing plate 17b so as to penetrate through a cylindrical portion 17c formed in the second reinforcing plate 17b.

The band main body 12 has a uniform width and thickness in the entire length thereof. Tip edges 12c of the first and second reinforcing plate attaching portions 12a and 12b having a rectangular shape in front view are formed in straight lines parallel to the axis L of the annular portion 16 (the axis of the cylinder tube 5). A plurality of antisliding projections 22 are formed in the annular portion 16 by pressing so as to protrude towards an inner peripheral surface side of the annular portion 16.

Some of the projections among the plurality of projections 22 are horizontally long projections 22a that extend in the width direction of the band main body 12 and the remaining projections are vertically long projections 22b that extend in the length direction. The horizontally long projections 22a and the vertically long projections 22b are formed in the annular portion 16 so as to be disposed adjacent to each other.

However, the shapes of the projections 22 are not limited to such shapes and may be any shape such as, for example, a T-shape, a cross-shape, or an X-shape in which the horizontally long projection 22a and the vertically long projection 22b are merged together, or may be a punctiform.

Furthermore, in the embodiment illustrated in the drawings, the projections 22 are formed so as to be shaped and disposed only at the two end portions of the annular portion 16 in the circumferential direction and symmetrically with respect to the center of the annular portion 16 that extends in the circumferential direction. However, the projections 22 may be disposed at the middle portion in the circumferential direction as well, or may be disposed in the entire annular portion 16 in a uniform manner.

The shapes of the first and second reinforcing plates 17a and 17b in front view are rectangular shapes. The thicknesses of the reinforcing plates 17a and 17b are larger than the thickness of the band main body 12. The widths of the reinforcing plates 17a and 17b are the same as those of the reinforcing plate attaching portions 12a and 12b of the band main body 12.

Furthermore, inclined portions 17e inclined so as to approach each other are formed at the distal end portions (upper end portions) of the reinforcing plates 17a and 17b by inwardly bending the distal end portion along straight folding lines 17d that are parallel to the axis L of the annular portion 16. The tip edges 12c of the reinforcing plate attaching portions 12a and 12b of the band main body 12 extend along the folding lines 17d. In such a case, although it is desirable that the tip edges 12c abut against base end inner surfaces of the inclined portions 17e, a slight gap may be formed between the tip edges 12c and the base end inner surfaces.

The folding lines 17d may be radiused but it is desirable that the folding lines 17d each form an angle to the extent possible. Furthermore, a preferable inclination angle θ of the inclined portions 17e is 40 to 50 degrees and is especially preferable at 45 degrees. However, it may be any angle that is smaller than 90 degrees.

As illustrated in the drawings, it is desirable that both of the corner portions of each of the tip edges 12c of the reinforcing plate attaching portions 12a and 12b and both of the corner portions of each of the distal ends of the inclined portions 17e are chamfered in an arc shape.

Furthermore, inner surfaces at the lower end portions of the reinforcing plates 17a and 17b are formed into arcuate convex surfaces 17f in which the thicknesses thereof become gradually thinner towards outer surface sides of the reinforcing plates. The above is for, when mounting the fitting band 11 on the outer surface of the cylinder tube 5, preventing the boundary portions between the reinforcing plate attaching portions 12a and 12b of the band main body 12 and the annular portion 16 from being bent at an angle, such that the boundary portions can be curved smoothly along the convex surfaces 17f.

The position sensor 3 is a sensor in which a magnetic detection element, such as a reed switch, is built in a housing having a rectangular cross section. A screw insertion hole 23 for inserting the fastening screw 14 penetrates through the position sensor 3 in a left-right direction.

When the position sensor 3 is mounted on the cylinder tube 5, the position sensor 3 is abutted against an outer peripheral surface of the cylinder tube 5 and is held by the pair of sensor holding portions 13a and 13b of the fitting band 11 from both sides, and in such a state, the fastening screw 14 is inserted into the screw insertion holes 20 and 23 of the first sensor holding portion 13a and the position sensor 3 from the first sensor holding portion 13a side of the fitting band 11 and is screwed into and fastened to the screw hole 21 formed in the reinforcing plate 17b of the second sensor holding portion 13b.

By doing so, the position sensor 3 is pinched from both sides with the pair of sensor holding portions 13a and 13b, and the inclined portions 17e of the reinforcing plates 17a and 17b are abutted against the upper end portions of the lateral side of the position sensor 3 so that the position sensor 3 is urged against the outer surface of the cylinder tube 5 and is fixed in a stable manner while being abutted against the outer surface of the cylinder tube 5.

Furthermore, the inclined portions 17e being locked to the upper end portions of the lateral side of the position sensor 3 prevents the sensor holding portions 13a and 13b from tilting in a rotation direction of the fastening screw 14 associated with the fastening of the fastening screw 14. As a result, torsion of the band main body 12 is prevented.

Meanwhile, when fastening the pair of sensor holding portions 13a and 13b from both sides by fastening the fastening screw 14, due to frictional force acting between the fastening screw 14 and the first and second reinforcing plates 17a and 17b, rotational force acting in a direction following the rotation of the fastening screw 14 acts on the reinforcing plates 17a and 17b. Due to the rotational force, shearing force in the rotation direction of the fastening screw 14 acts between the first and second reinforcing plates 17a and 17b and the first and second reinforcing plate attaching portions 12a and 12b.

However, in the embodiment described above, since the inclined portions 17e bent along the folding lines 17d are formed at the distal end portions of the reinforcing plates 17a and 17b, and the linearly-shaped tip edges 12c of the reinforcing plate attaching portions 12a and 12b extend along the folding lines 17d, even if the reinforcing plates 17a and 17b are about to relatively rotate with respect the reinforcing plate attaching portions 12a and 12b, the inclined portions 17e lock the tip edges 12c such that relative rotation of the reinforcing plates 17a and 17b with respect to the reinforcing plate attaching portions 12a and 12b is prevented and relative misalignment, deformation, and the like in the rotation direction caused by shearing between the reinforcing plates 17a and 17b and the reinforcing plate attaching portions 12a and 12b are prevented. Moreover, by having the inclined portions 17e be locked to the upper end portions of the lateral side of the position sensor 3, the rotational force of the reinforcing plates 17a and 17b is reduced, and with the addition of the effect derived from above, the effect of preventing the rotation of the reinforcing plates 17a and 17b with respect to the reinforcing plate attaching portions 12a and 12b is further improved.

Accordingly, when the position sensor 3 is disposed between the first and second sensor holding portions 13a and 13b and fastened with the fastening screw 14, the inclined portions 17e of the reinforcing plates 17a and 17b have both a function of urging the position sensor 3 against the outer peripheral surface of the cylinder tube 5 by abutting against the upper end portions of the lateral side of the position sensor 3 and a function of preventing relative rotation of the reinforcing plates 17a and 17b with respect to the reinforcing plate attaching portions 12a and 12b by locking to the tip edges 12c of the reinforcing plate attaching portions 12a and 12b.

Note that in the embodiment described above, while the inclined portion 17e is formed in both of the first and second reinforcing plates 17a an 17b, as for the first reinforcing plate 17a positioned on the first sensor holding portion 13a side, the plain washer 15 is interposed between the reinforcing plate 17a and the screw head 14a of the fastening screw 14; accordingly, the rotational force transmitted from the fastening screw 14 to the reinforcing plate 17a is absorbed by the plain washer 15 and the shearing force in the rotation direction acting between the first reinforcing plate 17a and the first reinforcing plate attaching portion 12a becomes small. Accordingly, when the plain washer 15 is used, a reinforcing plate in which no inclined portion 17e is formed can be used as the first reinforcing plate 17a.

Furthermore, in the embodiment described above, while the reinforcing plate attaching portions 12a and 12b of the fitting band 11 and the reinforcing plates 17a and 17b are fixed to each other by a method, such as spot welding, the reinforcing plate attaching portions 12a and 12b and the reinforcing plates 17a and 17b may be unfixed to each other. In such a case, compared to when the reinforcing plate attaching portions 12a and 12b and the reinforcing plates 17a and 17b are fixed to each other, although the reinforcing plate attaching portions 12a and 12b and the reinforcing plates 17a and 17b are dispositioned in the rotation direction more easily, similar to the embodiment, by having the inclined portions 17e of the reinforcing plates 17a and 17b be locked to the tip edges 12c of the reinforcing plate attaching portions 12a and 12b, the relative rotation of the reinforcing plates 17a and 17b with respect to the reinforcing plate attaching portions 12a and 12b is prevented; accordingly, relative misalignment in the rotation direction between the reinforcing plates 17a and 17b and the reinforcing plate attaching portions 12a and 12b is prevented. Moreover, by having the inclined portions 17e be locked to the upper end portions of the lateral side of the position sensor 3, the rotational force of the reinforcing plates 17a and 17b is reduced, and with the addition of the effect derived from above, the effect of preventing the rotation of the reinforcing plates 17a and 17b with respect to the reinforcing plate attaching portions 12a and 12b is further improved.

Note that recessed portions each having a width in which the corresponding sensor holding portions 13a and 13b of the fitting band 11 just fit may be formed in both the left and right lateral sides of the position sensor 3 at portions where the sensor holding portions 13a and 13b abut against. With the recessed portions, the prevention of rotation of the reinforcing plates 17a and 17b with respect to the reinforcing plate attaching portions 12a and 12b is promoted; accordingly, the position sensor 3 can be mounted in a further stable manner with the fitting band 11. The effect of the above is particularly large in the case in which the reinforcing plate attaching portions 12a and 12b and the reinforcing plates 17a and 17b are unfixed to each other.

REFERENCE SIGNS LIST 1 sensor mounting device
2 hydraulic cylinder
3 position sensor
5 cylinder tube
6 piston
11 fitting band
12 band main body
12a, 12b reinforcing plate attaching portion
12c tip edge
13a, 13b sensor holding portion
14 fastening screw
16 annular portion
17a, 17b reinforcing plate
17d folding line
17e inclined portion
20 screw insertion hole
21 screw hole
22 projection
L axis
θ inclination angle

The invention claimed is:

1. A sensor mounting device for mounting, on an outer periphery of a cylindrical cylinder tube, a position sensor that detects a position of a piston of a hydraulic cylinder, the sensor mounting device comprising:
   a fitting band; and
   a fastening screw that fastens the fitting band and that fixes the position sensor onto the cylinder tube,
   wherein the fitting band includes an annular portion wound and attached around the outer periphery of the cylinder tube, and first and second sensor holding portions formed on a first end and a second end of the annular portion so as to oppose each other, the first and second sensor holding portions pinching the position sensor from both sides,
   wherein the annular portion is formed of a metal belt-shaped band main body, the first and second sensor holding portions are formed by being provided with metal reinforcing plates in a superposed manner on an outer surface of first and second reinforcing plate attaching portions formed at a first end and a second end of the band main body so as to oppose each other, screw insertion holes for inserting the fastening screw are formed in the first and second reinforcing plate attaching portions and a first reinforcing plate provided on the first reinforcing plate attaching portion in a superposed manner, and a screw hole for screwing the fastening screw thereto is formed in a second reinforcing plate provided on the second reinforcing plate attaching portion in a superposed manner,
   wherein tip edges of the first and second reinforcing plate attaching portions of the band main body are formed in straight lines parallel to an axis of the annular portion, and
   wherein shapes of the first and second reinforcing plates in front view are rectangular, an inclined portion is at least formed at a distal end portion of the second reinforcing plate among the first and second reinforcing plates by inwardly bending the distal end portion along a folding line parallel to the axis of the annular portion, the tip edge of the reinforcing plate attaching portion among the first and second reinforcing plate attaching portions of the band main body including the reinforcing plate having the inclined portion provided in a superposed manner extends along the folding line of the inclined portion.

2. The sensor mounting device according to claim 1,
   wherein when fixing the position sensor disposed between the first and second sensor holding portions to an outer peripheral surface of the cylinder tube by fastening the fastening screw, the inclined portion of the reinforcing plate has both a function of urging the position sensor against the outer peripheral surface of the cylinder tube by abutting against an upper end portion of a lateral side of the position sensor, and a function of preventing relative rotation of the reinforcing plate with respect to the reinforcing plate attaching portion by locking to the tip edge of the reinforcing plate attaching portion.

3. The sensor mounting device according to claim 1, wherein the inclined portion is formed in both of the first and second reinforcing plates, the tip edges of the first and second reinforcing plate attaching portions each extend along a folding line of the inclined portion of the corresponding one of the first and second reinforcing plates.

4. The sensor mounting device according to claim 2, wherein a thickness of each reinforcing plate is larger than a thickness of the band main body, a width of each reinforcing plate is equivalent to a width of each reinforcing plate attaching portion in the band main body, and an inclination angle of each inclined portion is smaller than 90 degrees.

5. The sensor mounting device according to claim 1, wherein the first reinforcing plate attaching portion and the first reinforcing plate are fixed to each other, and the second reinforcing plate attaching portion and the second reinforcing plate are fixed to each other.

6. The sensor mounting device according to claim 2, wherein the first and second reinforcing plate attaching portions and the first and second reinforcing plates, respectively, are unfixed to each other.

7. The sensor mounting device according to claim 1, wherein a plurality of anti sliding projections that protrude on an inner peripheral surface side of the annular portion are formed in the annular portion of the band main body.

8. The sensor mounting device according to claim 2, wherein the inclined portion is formed in both of the first and second reinforcing plates, the tip edges of the first and second reinforcing plate attaching portions each extend along a folding line of the inclined portion of the corresponding one of the first and second reinforcing plates.

9. The sensor mounting device according to claim 2, wherein a thickness of each reinforcing plate is larger than a thickness of the band main body, a width of each reinforcing plate is equivalent to a width of each reinforcing plate attaching portion in the band main body, and an inclination angle of each inclined portion is smaller than 90 degrees.

10. The sensor mounting device according to claim 2, wherein the first reinforcing plate attaching portion and the first reinforcing plate are fixed to each other, and the second reinforcing plate attaching portion and the second reinforcing plate are fixed to each other.

11. The sensor mounting device according to claim 2, wherein the first and second reinforcing plate attaching portions and the first and second reinforcing plates, respectively, are unfixed to each other.

12. The sensor mounting device according to claim 2, wherein a plurality of anti sliding projections that protrude on an inner peripheral surface side of the annular portion are formed in the annular portion of the band main body.

* * * * *